US 6,558,004 B2

(12) United States Patent
Ito et al.

(10) Patent No.: US 6,558,004 B2
(45) Date of Patent: May 6, 2003

(54) PROJECTOR

(75) Inventors: Shinsuke Ito, Suwa (JP); Takeshi Takizawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/899,289

(22) Filed: Jul. 6, 2001

(65) Prior Publication Data

US 2002/0015138 A1 Feb. 7, 2002

(30) Foreign Application Priority Data

Jul. 7, 2000 (JP) ........................................ 2000-207077

(51) Int. Cl.⁷ ........................... G03B 21/18; G03B 21/26
(52) U.S. Cl. ............................... 353/57; 353/58; 353/61
(58) Field of Search ................................ 353/57, 58, 61

(56) References Cited

U.S. PATENT DOCUMENTS

| 5,951,136 A | * | 9/1999 | Furuhata et al. | 353/31 |
| 6,254,238 B1 | * | 7/2001 | Takamatsu | 353/61 |
| 6,280,038 B1 | * | 8/2001 | Fuse et al. | 353/57 |
| 6,334,686 B1 | * | 1/2002 | Shiraishi et al. | 353/119 |
| 6,364,492 B1 | * | 4/2002 | Fujimori et al. | 353/119 |
| 6,398,366 B1 | * | 6/2002 | Hara et al. | 353/119 |

FOREIGN PATENT DOCUMENTS

| JP | A 07-016819 | 1/1995 |
| JP | A 8-304739 | 11/1996 |

* cited by examiner

*Primary Examiner*—Russell Adams
*Assistant Examiner*—D. Ben Esplin
(74) *Attorney, Agent, or Firm*—Oliff & Berridge, PLC.

(57) ABSTRACT

The invention provides a projector capable of cooling a light-source lamp efficiently and suppressing noises as well. In a first cooling system, the base side of a light-source lamp, which reaches a high temperature, is intensively cooled by a first sirocco fan. An axial-flow exhaust fan is provided close to the light-source lamp so that cooling air is allowed to quickly flow while cooling the light-source lamp. Therefore, even when the first sirocco fan, in which the air pressure of cooling air is liable to be reduced, is used, heat generated in the light-source lamp can be smoothly radiated, thereby efficiently cooling the light-source lamp. Since the first sirocco fan is remarkably quiet as compared to an axial-flow fan, noises are suppressed to a low level.

8 Claims, 10 Drawing Sheets

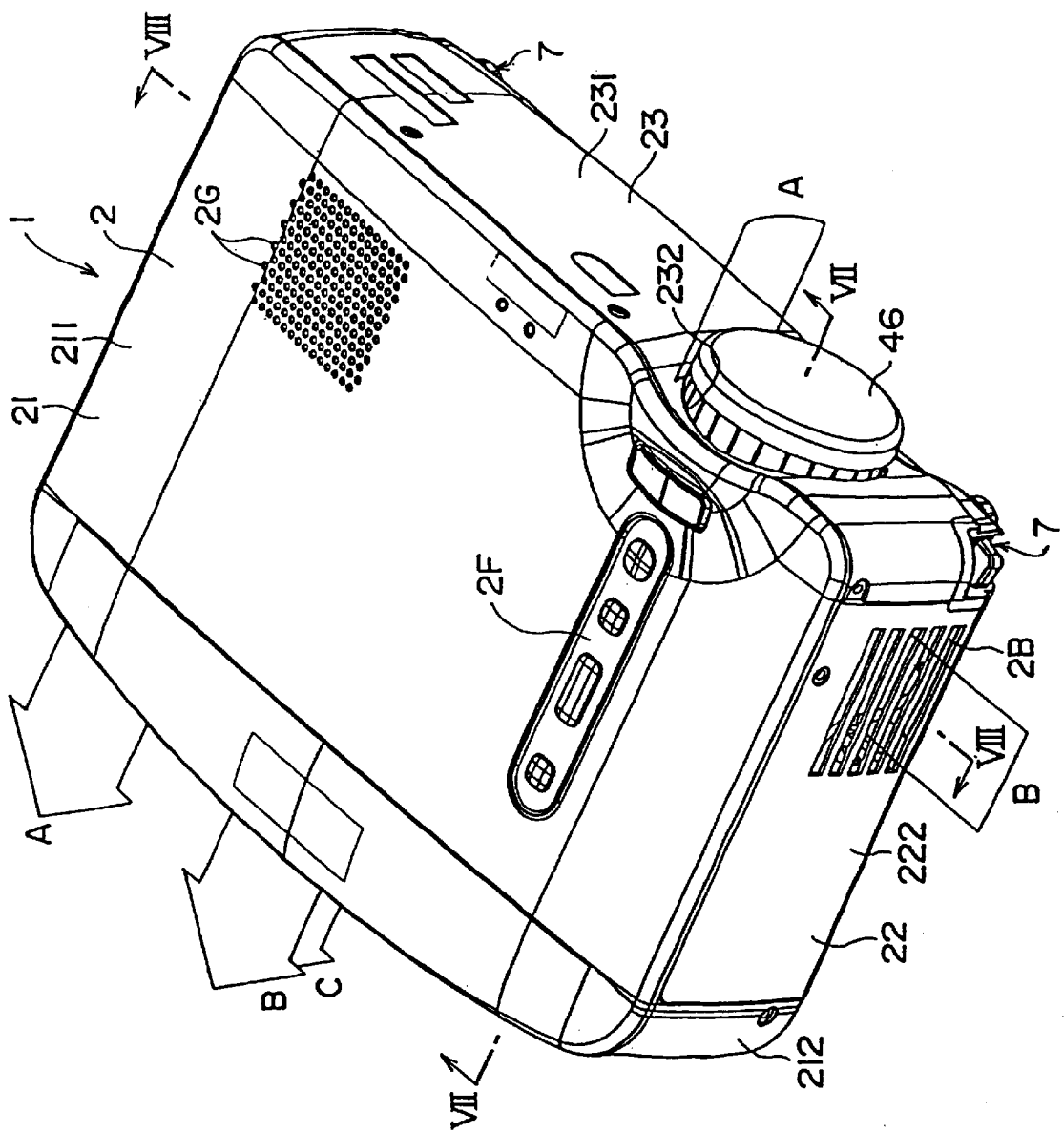
[FIG. 1]

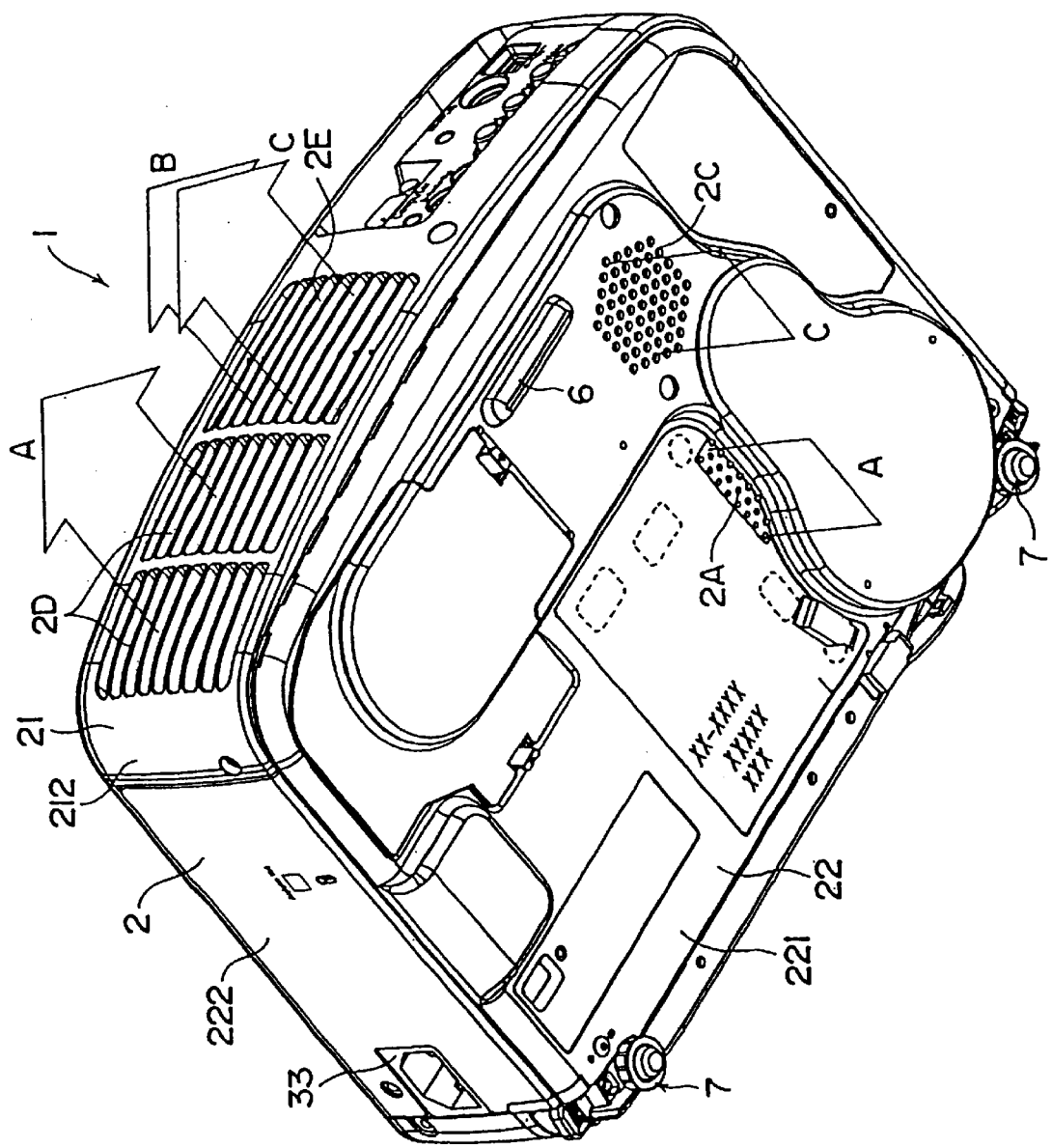
[FIG. 2]

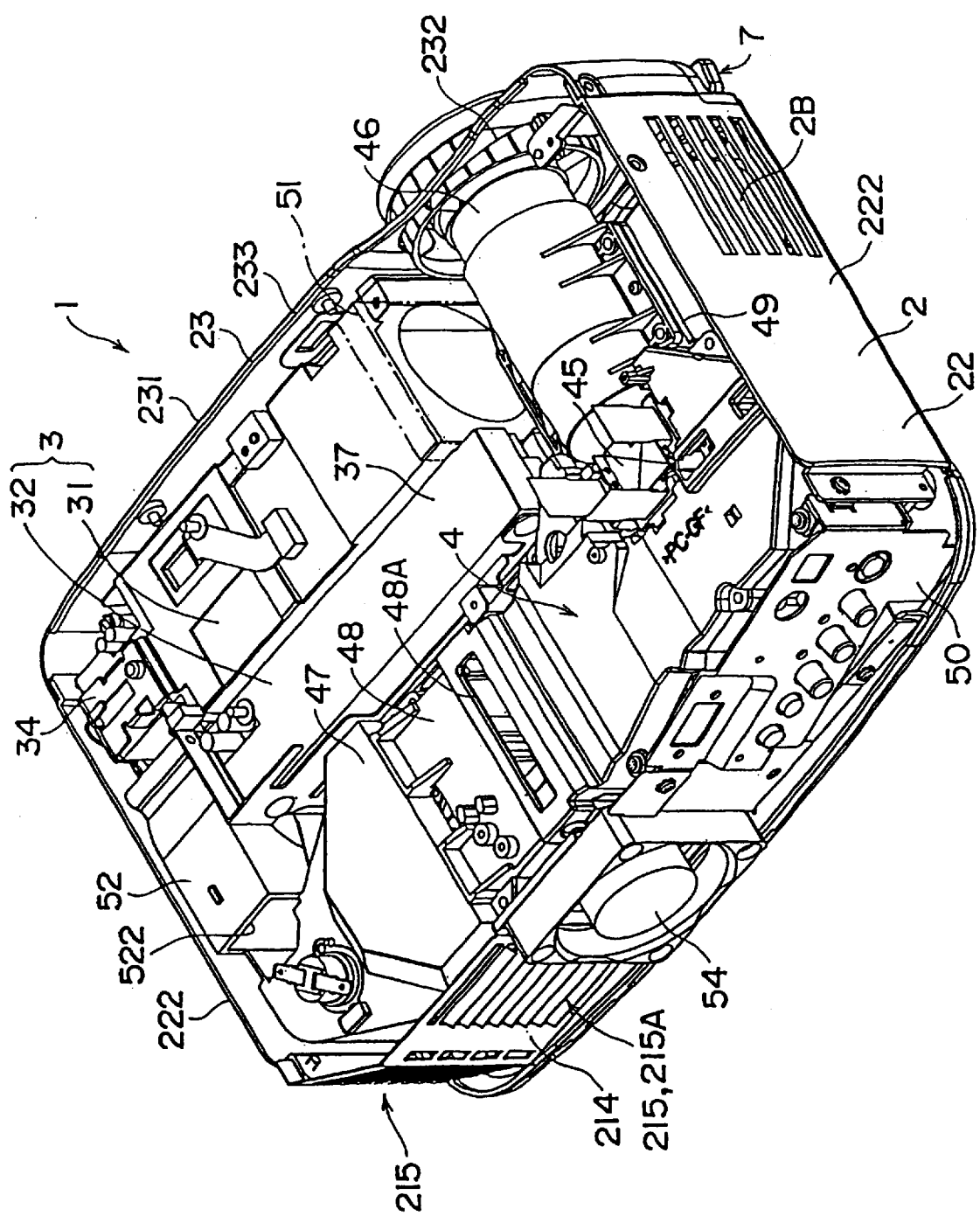
[FIG. 3]

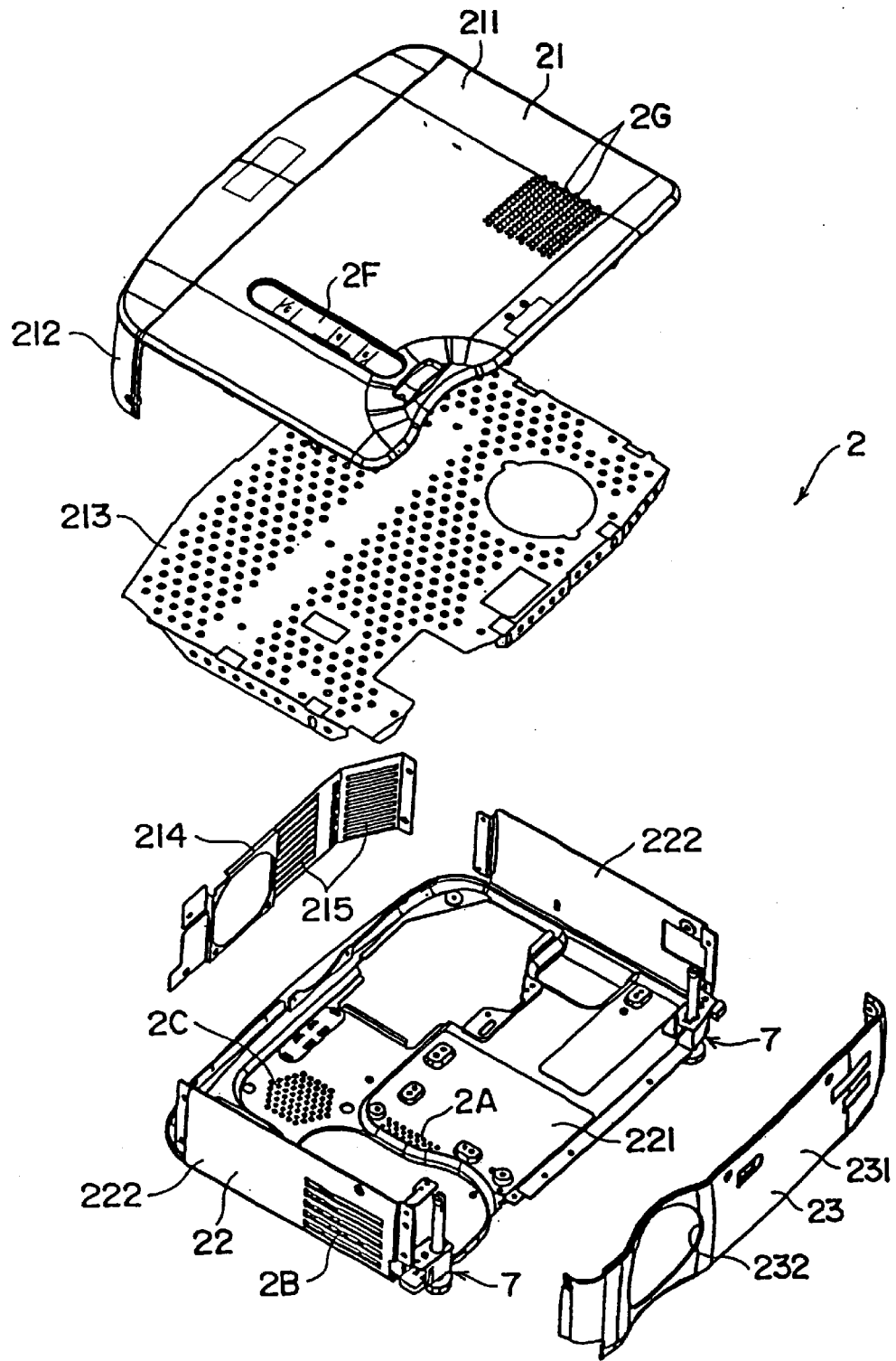
[FIG. 4]

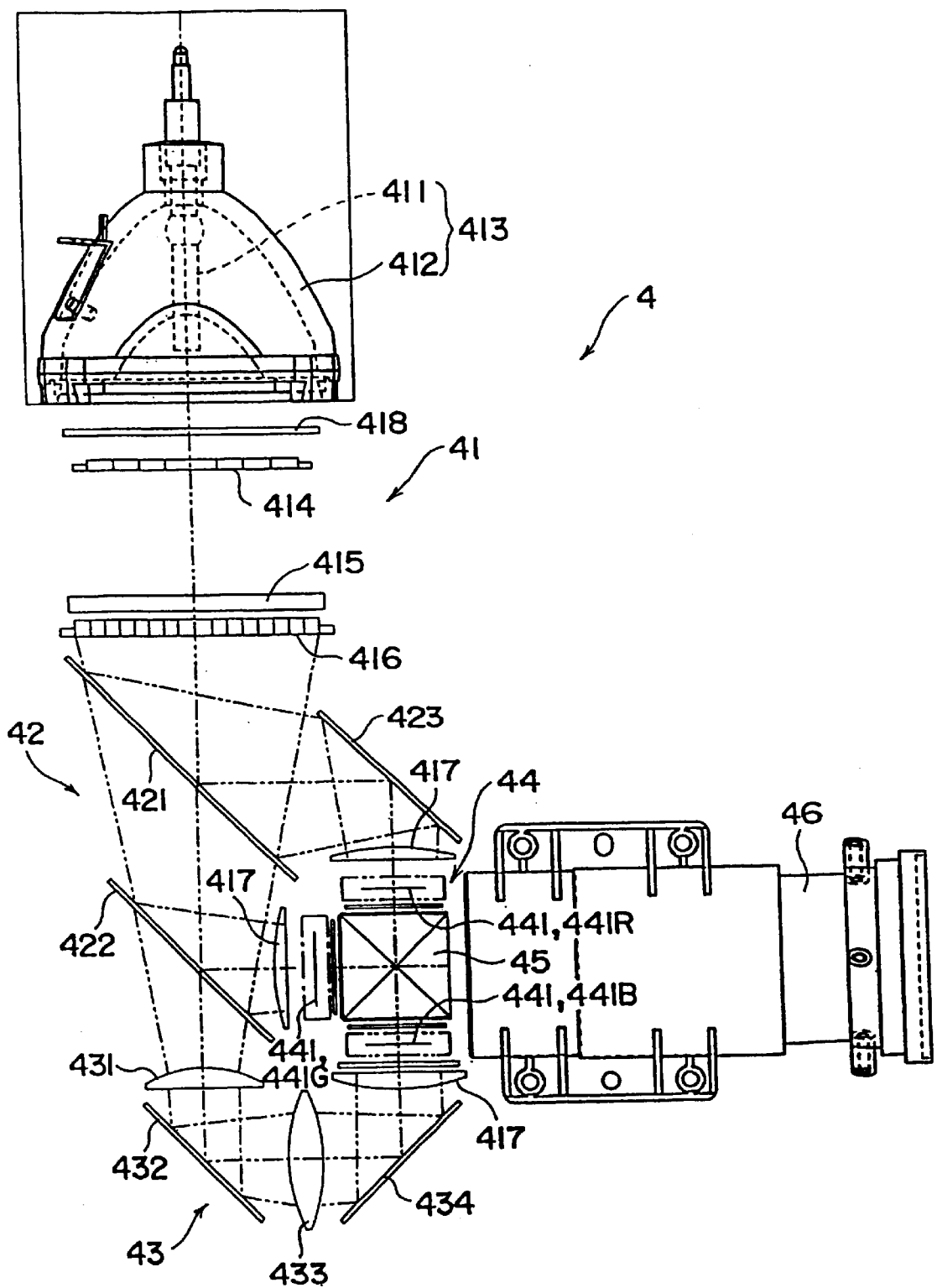
[FIG. 5]

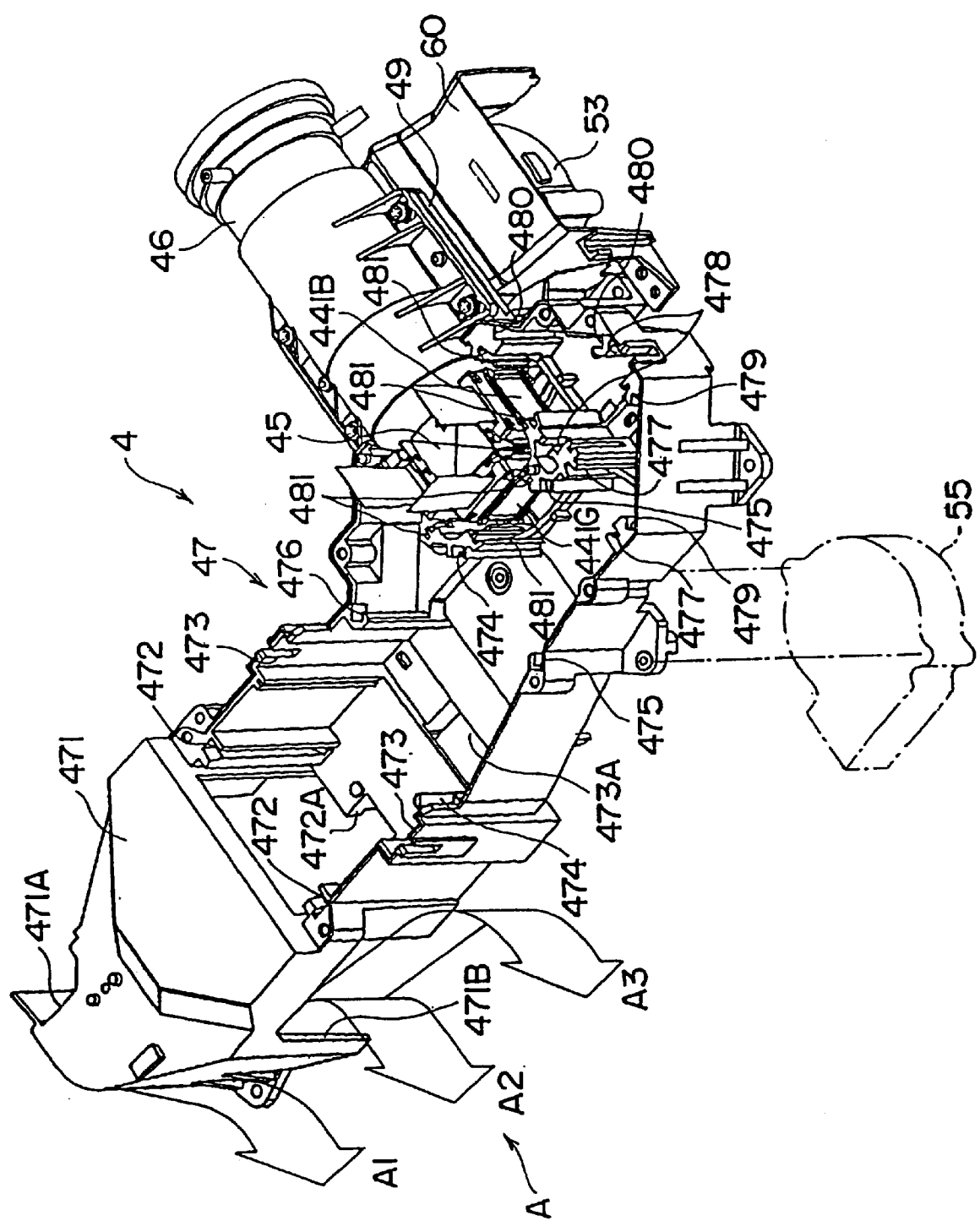
[FIG. 6]

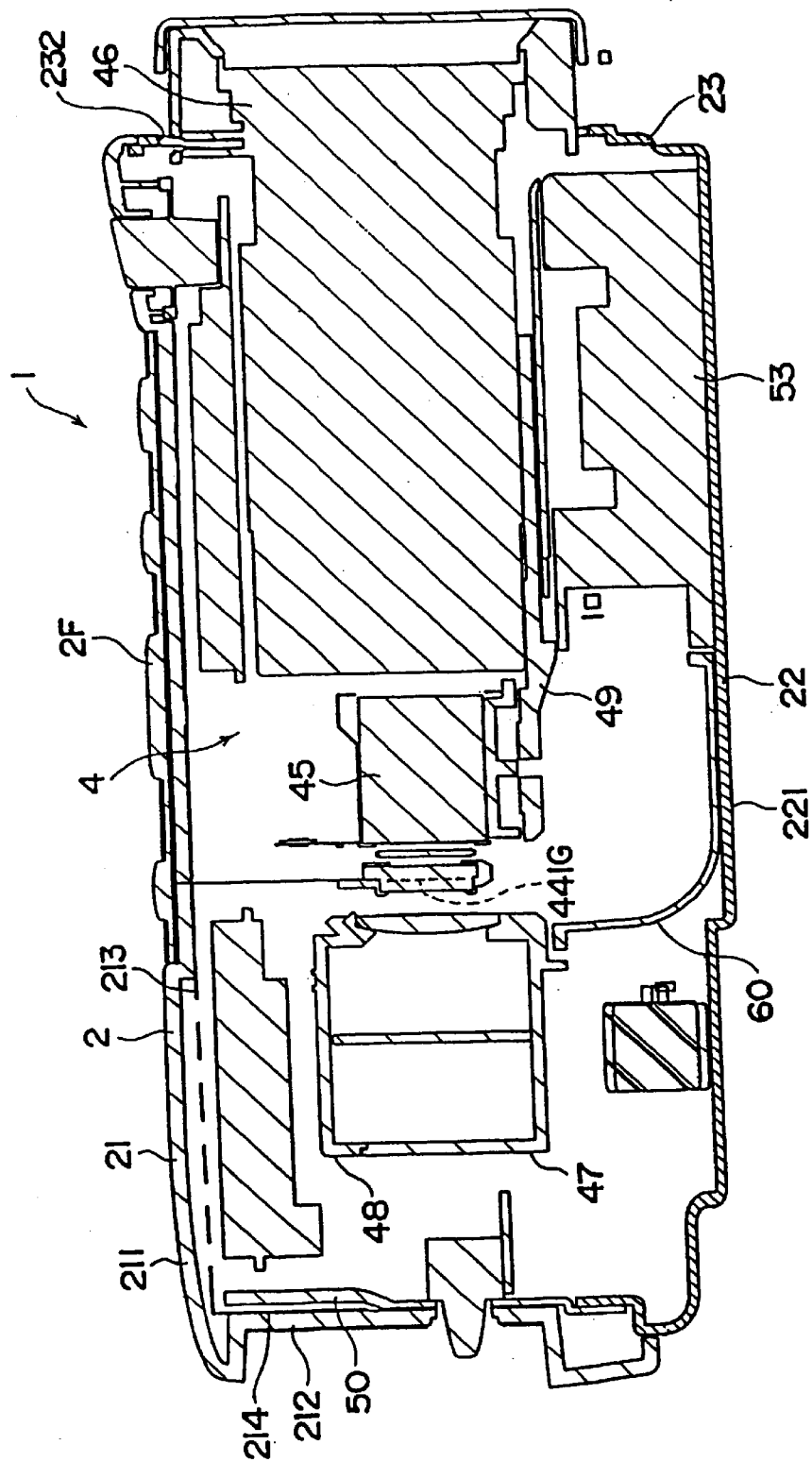
[FIG. 7]

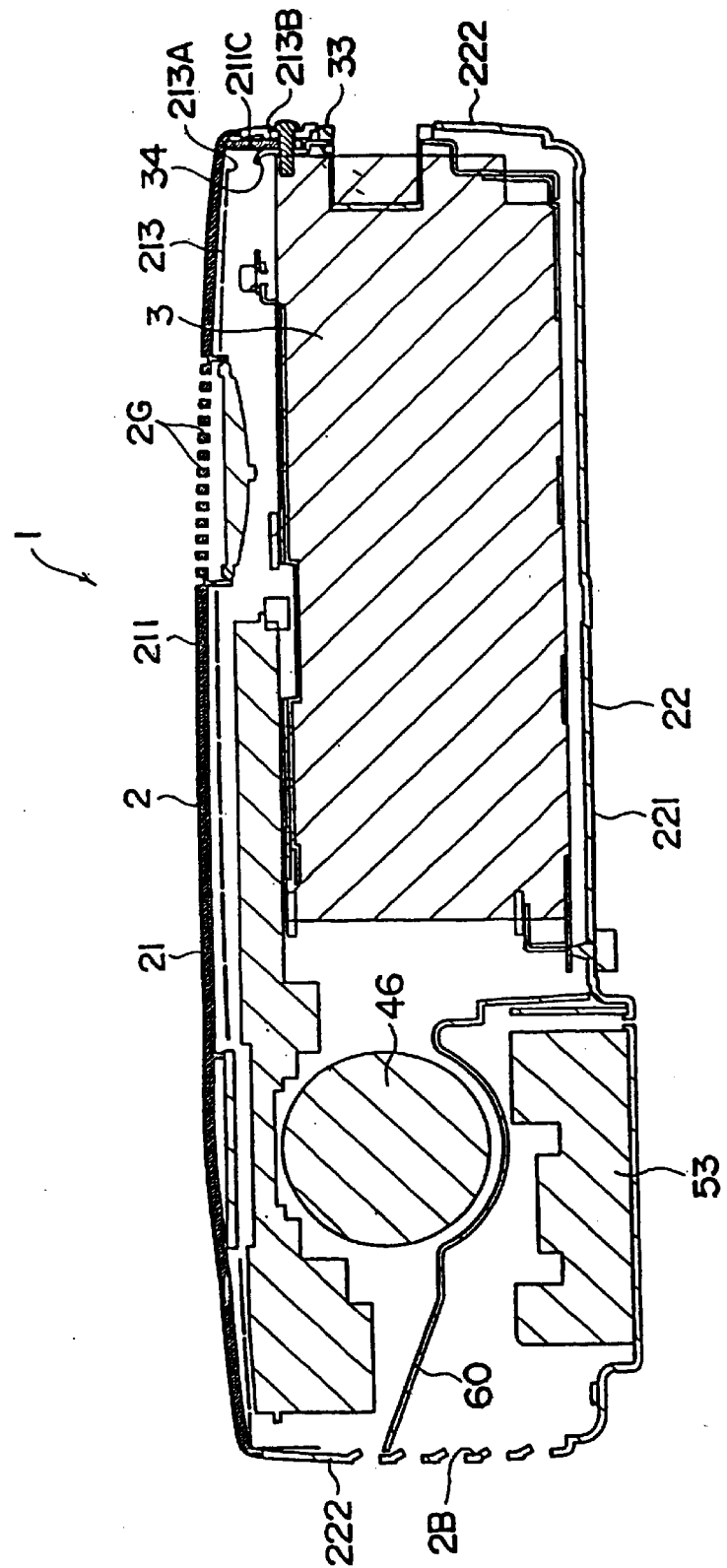
[FIG. 8]

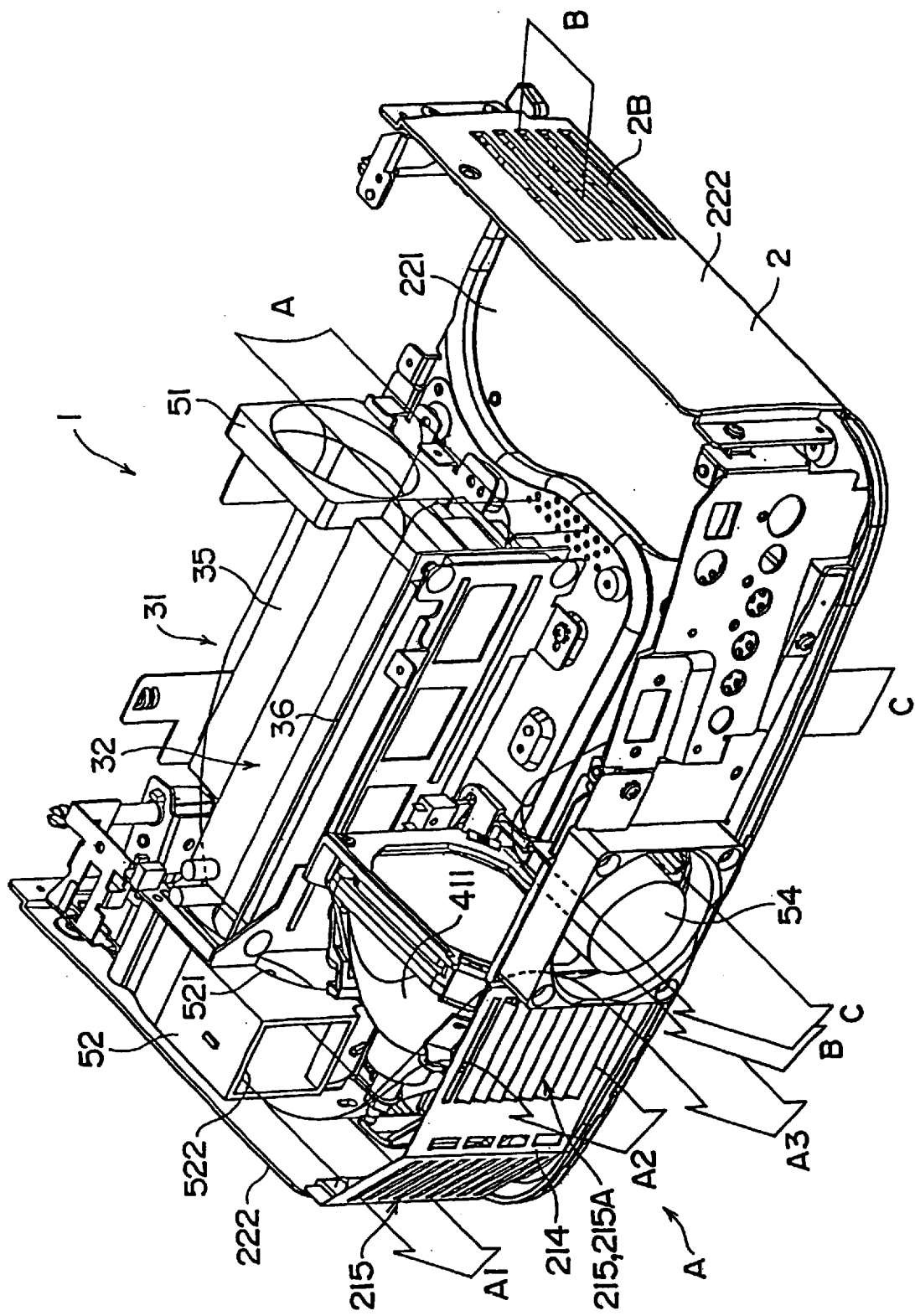
[FIG. 9]

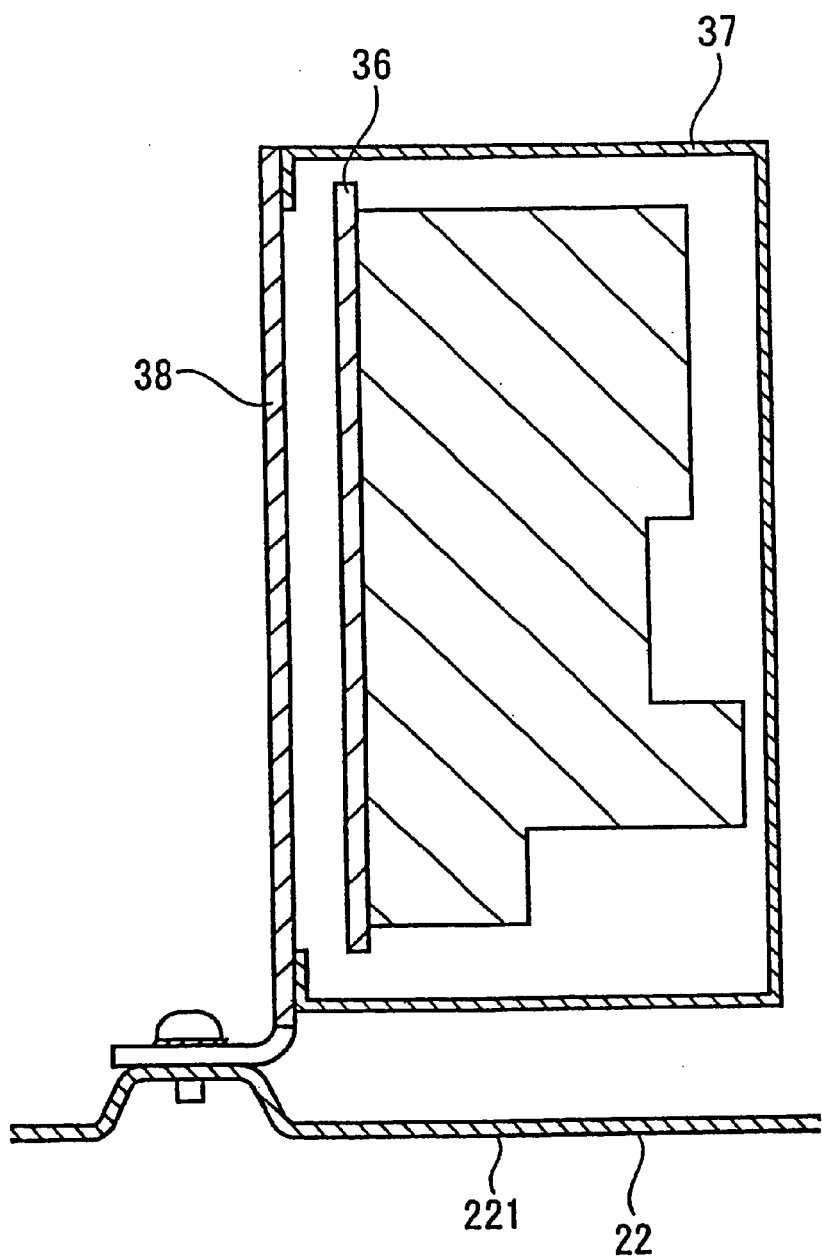
[FIG. 10]

PROJECTOR

BACKGROUND OF THE INVENTION

1. Field of Invention

The present invention relates to a projector for forming a projected image by magnifying and projecting luminous flux emitted from a light source after modulating the luminous flux.

2. Description of Related Art

The number of environments in which projectors are used has recently increased. Apart from for presentations in office meetings or meetings on business trips, projectors are now also being used at technical meetings in research and development divisions, etc., for capturing CAD/CAM/CAE data therein in order to magnify and project the data, or at various seminars and learning courses. Projectors are also being used in school classes where audiovisual education is performed. Projectors are also being used for studying therapeutic methods and for performing medical guidance by projecting medical images and data, such as CT scans and MRI. Projectors are also being used for efficiently addressing numerous people gathered at exhibitions or conventions.

Presently, as projectors are being used in various environments, various requirements exist regarding the specifications and functions of projectors, such as light-weight compact models pursuing portability, high-luminance and high-resolution models pursuing image quality, and value-added models capable of connecting to various digital equipment and mobile tools.

Since further increases in the number of environments in which the projectors will be used is anticipated, more advanced value-added projectors are being vigorously developed in light of the new environments in which projectors will be used.

In any of these projector models, a cooling structure is provided with cooling air for cooling a heat-generating source, such as a light-source lamp, a power-supply unit, and a liquid-crystal panel. Specifically, cooling air is supplied from an air-inlet formed on an outer case by an air-intake fan, and the cooling air is exhausted outside from an air-outlet of the outer case by an exhaust fan after passing through inside the heat-generating source.

In such fans, an air-intake fan, used especially in the vicinity of the light-source lamp, has a rather larger size relative to air-intake fans for cooling other heat-generating sources and an exhaust fan, so that the entire light-source lamp, which is most liable to reach a high temperature in heat-generating sources, is securely cooled by a large amount of air-flow. Therefore, an axial-flow fan having a rotor with a large diameter may be frequently used as an exhaust fan for cooling the light-source lamp. Thus, a problem arises that large noises are generated due to the rotation of the fan.

In addition, noises generated during the rotation of the fan can be suppressed by using a sirocco fan instead of the axial-flow fan; however, the sirocco fan may reduce the cooling efficiency because it is liable to produce an air pressure that is lower than the air pressure of the axial-flow fan.

SUMMARY OF THE INVENTION

It is a first object of the present invention to provide a projector that is capable of cooling a light-source lamp efficiently and suppressing noises as well.

In addition to the light-source lamp, a driving circuit board that drives the light-source lamp is one of parts that is liable to reach a high temperature.

However, since the driving circuit-board is arranged adjacent to the light-source lamp, when a fan that is exclusively for the driving circuit-board is provided, both the fans are successively arranged, thereby increasing the projector size and the noises generated by the projector. Therefore, conventionally, the driving circuit-board is also cooled by the fan for cooling the light-source lamp in order to give preference to miniaturization and reduction in noises of the projector. This creates a problem that the cooling efficiency is lower than the cooling efficiency when the driving circuit-board and the light-source lamp are separately cooled by the respective fans.

It is a second object of the present invention to provide a projector capable of efficiently cooling internal elements, such as a light-source lamp adjacent to a driving-circuit board for the light-source lamp, in addition to the driving-circuit board, and moreover being capable of promoting the miniaturization and reduction in noises generated by the projector.

A projector according to the present invention includes a light-source lamp, a sirocco fan that exhausts cooling air to the base side of the light-source lamp, and an axial-flow fan disposed in the vicinity of the light-source lamp that exhausts the cooling air which is finished performing cooling. Luminous flux emitted from the light-source lamp is magnified and projected so as to form a projected image after being modulated.

In this application, "base side" is referred to as the side opposite to light-emergence.

In the light-source lamp, such as a metal-halide lamp which is frequently used in projectors, heat is generated in a light-emission portion which is set as a light source; a large amount of the heat is transferred to the base side therefrom and is radiated.

Accordingly, in the present invention, the base side of the light-source lamp is intensively cooled by the sirocco fan, while the exhaust fan is provided close to the light-source lamp so that the cooling air exhausted from the sirocco fan is allowed to quickly flow to cool the light-source lamp. Therefore, even when a sirocco fan in which the air pressure of cooling air is liable to be reduced is used, the heat generated in the light-source lamp can be smoothly radiated into cooling air, thereby efficiently cooling the light-source lamp. Since the sirocco fan is quiet compared to a conventional axial-flow fan, noises are suppressed to a low level. Thereby, a first advantage of the present invention is achieved.

In addition, in the present invention, an axial-flow fan is used to exhaust cooling air. Such an axial-flow fan may be a conventional fan. When the axial-flow fan is used, noises cannot be increased compared with those of a conventional projector. Moreover, advantages described above can be securely achieved by arranging the axial-flow fan in the vicinity of the light-source lamp.

In a projector according to the present invention, an air-inlet of the sirocco fan may be preferably arranged to face a driving-circuit board.

In such a structure, cooling air is allowed to pass through the driving-circuit board, for driving the light-source lamp, before being received by the sirocco fan, so that both of the light-source lamp and the driving-circuit board can be efficiently cooled solely by the sirocco fan. Since the driving-circuit board does not need an exclusive fan for cooling itself, miniaturization of the projector is promoted.

In a projector according to the present invention, the driving-circuit board may be preferably accommodated in a case member having a hole bored therethrough along the direction of the cooling airflow. In such a structure, since the driving-circuit board is accommodated in the case member capable of allowing cooling air to flow therethrough, the case member also serves as the duct covering the driving-circuit board. Therefore, cooling air is allowed to securely flow along the driving-circuit board, thereby enhancing the cooling efficiency of the driving-circuit board.

In a projector according to the present invention, a power-supply-circuit board may be preferably arranged adjacent to the driving-circuit board.

The power-supply circuit board is also liable to reach a high temperature. The power-supply circuit board is arranged adjacent to the driving-circuit board, so that cooling air for cooling the power-supply circuit board is allowed to smoothly flow by acceleration of the air due to the receiving action of the sirocco fan, enabling the cooling efficiency of the power-supply circuit board to be also enhanced.

In a projector according to the present invention, the power-supply-circuit board may be preferably arranged between the sirocco fan and another axial-flow fan that receives cooling air from the outside.

In such a structure, the power-supply circuit board is positively cooled also by the axial-flow fan, so that the cooling efficiency of the power-supply circuit can be further enhanced.

In a projector according to the present invention, the flow path between the sirocco fan and the axial-flow fan for the exhaust may be preferably provided with an opening for outwardly exhausting part of the cooling air exhausted from the sirocco fan.

In such a structure, the flow path between the sirocco fan and the axial-flow exhaust fan is provided with the opening for exhaust, so that the cooling air exhausted from the sirocco fan can be more efficiently exhausted through the axial-flow exhaust fan and the opening for exhaust. Therefore, although the flow rate of the sirocco fan may be increased, the axial-flow fan does not need to increase the flow rate thereof to enhance exhaust efficiency, so that by using the sirocco fan having a large flow rate, the cooling efficiency of the light-source lamp can be even further enhanced while maintaining a low noise level.

A projector according to the present invention includes a light-source lamp, a sirocco fan for use in internal cooling, and a driving-circuit board that drives the light-source lamp. Luminous flux emitted from the light-source lamp is magnified and projected so as to form a projected image after being modulated. An air-inlet of the sirocco fan is arranged to face the driving-circuit board.

In such a structure, in addition to the fact that the driving-circuit board is cooled by the cooling airflow caused by the receiving action of the sirocco fan, internal elements, such as the light-source lamp, can be also cooled by the cooling air exhausted from the sirocco fan. Since the sirocco fan is quiet compared to a conventional axial-flow fan that is rather large in size, noises are suppressed to a low level. Since the internal elements, such as the light-source lamp, do not need an exclusive fan for cooling them, miniaturization of the projector is promoted.

Preferably, a projector according to the present invention further includes another sirocco fan that exhausts cooling air toward the front face (front light-emergence side) of the light-source lamp.

In such a structure, optical elements disposed close to the front face of the light-source lamp are excellently cooled.

BRIEF DESCRIPTION OF THE DRAWINGS

FIG. 1 is a perspective view of the entire projector according to an embodiment of the present invention as viewed from above the projector;

FIG. 2 is a perspective view of the entire projector as viewed from below the projector;

FIG. 3 is a perspective view of the projector showing the inside thereof;

FIG. 4 is an exploded perspective view of an outer case according to the embodiment of the invention;

FIG. 5 is a plan view schematically showing each optical system of the projector;

FIG. 6 is a perspective view of an optical unit of the projector showing structural members thereof;

FIG. 7 is a longitudinal sectional view as viewed in the direction of the arrows VII—VII in FIG. 1;

FIG. 8 is a longitudinal sectional view as viewed in the direction of the arrows VIII—VIII in FIG. 1;

FIG. 9 is a schematic view showing a cooling system according to the embodiment of the invention;

FIG. 10 is an enlarged longitudinal sectional view of a significant part of the embodiment of the invention.

DETAILED DESCRIPTION OF PREFERRED EMBODIMENTS

An embodiment according to the present invention will be described below with reference to the drawings.

1. Principal Structure of Projector

FIG. 1 is a perspective view of the entire projector 1 according to an embodiment of the present invention as viewed from above the projector; FIG. 2 is a perspective view of the entire projector 1 as viewed from below the projector; and FIG. 3 is a perspective view of the projector 1 showing the inside thereof.

In FIGS. 1 to 3, the projector 1 includes a substantially cubic-box-like outer case 2, a power-supply unit 3 accommodated within the outer case 2, and an optical unit 4 having an L-shaped surface and also being accommodated within the outer case 2.

As is shown in FIG. 4, the outer case 2 includes an upper case 21 made from a synthetic resin, a lower case 22 made from a metal such as aluminum, and a front case 23 also made from a metal such as aluminum.

The upper case 21 is integrally formed of a top face 211 and a back face 212.

Inside the top face 211, a porous first electromagnetic-shielding member 213, made by punching an aluminum plate, is detachably arranged. Inside the back face 212 of the upper case 21, a second electromagnetic-shielding member 214, made from an aluminum plate, is also arranged. The second electromagnetic-shielding member 214 is connected to the lower case 22 with screws.

The lower case 22 is integrally formed of a bottom face 221 and a pair of side faces 222 opposing each other. The bottom face 221 and the side faces 222 are bent to each other by bending an aluminum plate, etc., formed by a press, a machining center, and so forth to have a predetermined shape.

Both front corners of the bottom face 221 are provided with height-adjustment mechanisms 7 that adjust the inclination of the entire projector 1 so as to align the projected image position. On the other hand, in the center on the rear side of the bottom face 221, a foot member 6 (FIG. 2), made from a resin, is solely fitted therein.

The front case 23 is a member for forming a front face 231 of the outer case 2, and is also made by bending or drawing an aluminum plate, etc., formed by a press, a machining center, and so forth to have a predetermined shape. The front case 23 is provided with a circular opening 232 formed therein corresponding to a projection lens 46. The periphery of the circular opening 232 is curved inwardly by drawing.

In the outer case 2, there are provided air-inlets 2A, 2B, and 2C that inwardly receives cooling air, air-outlets 2D and 2E that exhaust cooling air from the inside, an operating panel 2F, and further a number of holes 2G formed corresponding to the position of a speaker.

The power-supply unit 3 includes a main power-supply 31 arranged in the front face side within the outer case 2 (FIG. 3), and a ballast unit 32 arranged in the rear of the main power-supply 31. The main power-supply 31 supplies electric power received through a power cable to the ballast unit 32 and a driver board (electronic circuit board, not shown), etc., and includes an inlet connector 33 (FIG. 2) into which the power cable is inserted, an aluminum frame 34 surrounding the periphery, and a power-supply circuit board 36 (FIG. 9).

The ballast unit 32 mainly supplies electric power to a light-source lamp 411 (FIGS. 5 and 9) of the optical unit 4, and includes a lamp-driving circuit board 35 (FIG. 9).

As is shown in FIG. 5, the optical unit 4 includes an integrator-illumination optical system 41, a color-separation optical system 42, a relay optical system 43, an electro-optical system 44, a cross-dichroic prism 45 as a color-synthesis optical system, and a projection lens 46 as a projection optical system.

2. Detail Structure of Optical System

FIG. 5, the integrator-illumination optical system 41 includes a light-source device 413 including a light-source lamp 411, such as a metal-halide lamp and a reflector 412, a first lens array 414, a polarization-converting element 415, and a second lens array 416. Luminous flux emitted from the light-source lamp 411 is reflected by the reflector 412 so as to focus at a focal point; then, it is divided into plural parts of luminous flux by the first lens array 414 arranged on the path to the focal point so as to be converted into one kind of polarized light by the polarization-converting element 415; and then it enters into the second lens array 416. Such a polarization-converting element 415 is disclosed in Japanese Unexamined Patent Application Publication No. 8-304739, for example.

Each part of luminous flux converted into the one kind of polarized light by the polarization-converting element 415 focuses on a condenser lens 417, and ultimately, it is substantially superimposed on liquid crystal panels 441 (liquid crystal panels 441R, 441G, and 441B, for each color) as three optical modulators (light valves) forming the electro-optical system 44.

The color-separation optical system 42 includes two dichroic mirrors 421 and 422 and a reflecting mirror 423, and divides plural parts of luminous flux emitted from the integrator-illumination optical system 41 into three light colors of red, green, and blue by the mirrors 421 and 422.

The relay optical system 43 includes an incidence-side lens 431, a relay lens 433, and reflecting mirrors 432 and 434, and introduces each light color separated by the color-separation optical system 42 to the liquid crystal panel. For example, blue light color is introduced to the liquid crystal panel 441B.

The electro-optical system 44 includes liquid crystal panels 441R, 441G, and 441B as to be three optical modulators. These panels are formed by using a poly-silicon TFT as a switching element, for example. Each light color separated by the color-separation optical system 42 is modulated by each of the three liquid crystal panels 441R, 441G, and 441B according to image information so as to form an optical image.

The cross-dichroic prism 45 forms images which are emitted from the three liquid crystal panels 441R, 441G, and 441B and are modulated for each color so as to form a color image. In addition, in the cross-dichroic prism 45, a dielectric multi-layer film that reflects a red light beam and a dielectric multi-layer film that reflects a blue light beam are formed along the four surfaces of the right-angle prism so as to have a substantially X-shape. Three light colors are synthesized by these dielectric multi-layer films. The color image synthesized in the cross-dichroic prism 45 is emitted from the projection lens 46 so as to be magnified and projected on a screen.

The optical systems 41 to 45 described above are accommodated within an inner case 47 made from a synthetic resin and shown in FIG. 6. That is, the inner case 47 is provided with grooves 472 to 481, into which the above-mentioned optical parts 414 to 416, 421 to 423, 431 to 434 are slidingly fitted from the upper part, as well as a light-source protector 471 that covers the light-source device 413. The polarization-converting element 415 and the second lens array 416 are fitted into the groove 473, both of which are integrated into one piece. Then, a cover 48 shown in FIG. 3 is attached to the inner case 47.

The inner case 47 is also provided with an aluminum head plate 49 (FIGS. 6 and 7) formed in the light-emergence side thereof. At one end of the head plate 49, the cross-dichroic prism 45, having the liquid crystal panels 441R, 441G, and 441B integrally attached thereto, is fixed, and the projection lens 46 is fixed on a flange along a semi-cylindrical portion at the other end.

3. Cooling Structure

As shown in FIGS. 1 to 3, within the projector 1, there are provided a first cooling system A in which the cooling air received from the side of the projection lens 46 and an air-inlet 2A formed on the bottom of the outer case 2 is exhausted from an air-outlet 2D, a second cooling system B in which the cooling air received from an air-inlet 2B formed on the side of the outer case 2 is exhausted from an air-outlet 2E, and a third cooling system C in which the cooling air received from an air-inlet 2C formed on the bottom of the outer case 2 is exhausted from the air-outlet 2E.

However, the flow of cooling air cannot be clearly divided into the cooling systems A to C; in fact, the movement of cooling air between the cooling systems A to C occurs inevitably to some extent via clearances between internal elements, etc.

As is shown in FIG. 9 in detail, in the first cooling system A, an axial-flow in-take fan 51 (shown by the alternate long and short dash lines in FIG. 3) is arranged in the side of the main power-supply 31 toward the projection lens 46, while a first sirocco fan 52 is arranged in the side of the ballast unit 32 toward the light-source device 413. The first sirocco fan 52 is a sirocco fan according to the present invention, and has an air-inlet 521 arranged in the side of the ballast unit 32 toward a lamp-driving circuit board 36 and an air-outlet 522 formed toward the light-source device 413.

By driving the axial-flow in-take fan 51, the cooling air received from the side of the projection lens 46 and from the air-inlet 2A is further received by the first sirocco fan 52 after cooling the power-supply circuit board 35 (including mounted circuit-elements) of the main power-supply 31.

By the in-take action of the first sirocco fan 52, part of the cooling air from the air-inlet 2A flows toward the sirocco fan 52 so as to be received therein, while cooling the lamp-driving circuit board 36 (including mounted circuit-elements). At this time, as shown in FIGS. 3 and 10, the lamp-driving circuit board 36 is accommodated within a case member 37 for safety policies made from a transparent resin, and is fixed to a base member 38 via a stud member (not shown). The cooling air from the air-inlet 2A flows into the case member 37 from an opening at one end of the case member 37, and flows out of an opening at the other end thereof to be received by the first sirocco fan 52.

Part of the cooling air (A1 in FIG. 9) exhausted from the first sirocco fan 52 passes through the back of the inner case 47 (FIGS. 3 and 6) and then, through one of louvers 215 of the second electromagnetic-shielding member 214 so as to be exhausted from the air-outlet 2D of the outer case 2.

The greater part (A2 in FIG. 9) of the cooling air exhausted from the first sirocco fan 52 enters inside the light-source protector 471 from a cut-out for intake 471A formed in the inner case 47 so as to intensively cool the light-source lamp 411 of the light-source device 413 from the base side thereof; then, it is exhausted from a cut-out for exhaust 471B (FIG. 6) so as to be finally exhausted outside the outer case 2 from the outlet 2D after passing through the other louver 215A as an opening for exhaust of the second electromagnetic-shielding member 214.

Furthermore, part of the cooling air (A3 in FIG. 9) that entered into the light-source protector 471 of the inner case 47 is compulsively induced by an axial-flow exhaust fan 54 in the back side disposed in the vicinity of the light-source device 413 (light-source lamp 411), and is exhausted from the air-outlet 2D or the air-outlet 2E, etc. The axial-flow exhaust fan 54 is an axial-flow fan according to the present invention, and runs the cooling air for cooling the light-source lamp 411 to quickly flow into and out of the light-source protector 471.

In the second cooling system B, as shown in the sectional views of FIGS. 7 and 8, a second sirocco fan 53 is arranged underneath the projection lens 46. The second sirocco fan 53 is placed in the intermediate portion of a duct member 60 (FIG. 6) that introduces cooling air from the air-inlet 2B toward the lower part of the electro-optical system 44.

The received air from the air-inlet 2B is introduced into the duct member 60 so as to be received by the second sirocco fan 53; then, it cools the electro-optical system 44 after being exhausted along the bottom surface of the outer case 2. Subsequently, the cooling air proceeds toward the axial-flow exhaust fan 54 while cooling the driver board (not shown) arranged above as a circuit board disposed flat, and then, it is exhausted by the exhaust fan 54 from the air-outlet 2E.

In the third cooling system C, as shown by the alternate long and short dash lines in FIG. 6, a third sirocco fan 55 is arranged at the position on the bottom surface of inner case 47 corresponding to that of the air-inlet 2C on the bottom face of the outer case 2. It is difficult for the air-inlet 2C to draw in dust on the set-up place of the projector 1 by reducing the diameter of each of the holes of the air-inlet 2C to be as small as possible.

The cooling air received into the third sirocco fan 55 from the air-inlet 2C passes through a duct-like section formed between the bottom surface of outer case 2 and the lower surface of the inner case 47 so as to be exhausted toward the light-source device 413; then, it is introduced into openings for in-take 472A and 473A (FIG. 6), which are respectively formed corresponding to the grooves 472 and 473 of the inner case 47; then, it cools a UV filter 418 as well as the above-mentioned unit arranged in the grooves 472 and 473 and including the first lens array 414, the polarization-converting element 415, and the second lens array 416 from a lower part toward an upper part. Then, the cooling air is exhausted from an opening for exhaust 48A (FIG. 3) of the cover 48; and it is finally exhausted from the air-outlet 2E by the axial-flow exhaust fan 54 in the backside. Therefore, in the embodiment, the third sirocco fan 55 is another sirocco fan according to the present invention.

4. Effect of the Embodiment (1) In the first cooling system A forming the cooling mechanism for the projector 1, the base side of the light-source lamp 411 which radiates heat at the highest rate can be intensively cooled by the first sirocco fan 52, and furthermore, by arranging the axial-flow exhaust fan 54 in the vicinity of the light-source lamp 411, the cooling air for cooling the light-source lamp 411 can quickly flow in the light-source protector 417 while cooling the light-source lamp 411. Therefore, even when using the first sirocco fan 52 in which the air pressure of cooling air is liable to be reduced, the heat generated in the light-source lamp can be smoothly radiated to cooling air, thereby effectively cooling the light-source lamp 411.

Since the noises of the first sirocco fan 52 are remarkably smaller than noise of a conventional axial-flow fan that is rather large in size, the noises can be suppressed to a low level.

(2) Since the air-inlet 521 of the first sirocco fan 52 is arranged so as to face the lamp-driving circuit board 36 of the ballast unit 32 that drives the light-source lamp 411, cooling air is allowed to pass through the lamp-driving circuit board 36 before being received by the first sirocco fan 52, so that both of the light-source lamp 411 and the lamp-driving circuit board 36, which are liable to reach a high temperature, can be efficiently cooled by the first sirocco fan 52 alone.

Since the light-source lamp 411 and the lamp-driving circuit board 36 do not need to be individually cooled by providing two separate fans, miniaturization of the projector 1 is promoted.

(3) The lamp-driving circuit board 36 is accommodated in the case member 37 for protection. The case member 37 has a hole bored therethrough along the direction of the cooling air flow. Since the case member 37 also serves as the duct covering the lamp-driving circuit board 36, cooling air is allowed to securely flow along the lamp-driving circuit board 36, thereby enhancing the cooling efficiency of the lamp-driving circuit board 36.

A case that satisfies safety standards, for example, can also serve as the case member 37, so that any duct does not need to be separately designed, thereby reducing the labor and cost therefor.

(4) The power-supply circuit board 35 of the main power-supply 31 is also liable to reach a high temperature. Since the power-supply circuit board 35 is arranged adjacent to the lamp-driving circuit board 36 to be cooled by the first sirocco fan 52, the cooling air for cooling the power-supply circuit board 35 is allowed to smoothly flow by acceleration of the air due to the receiving action of the first sirocco fan 52, enabling the cooling efficiency of the power-supply circuit board 35 to also be enhanced.

(5) At this time, the power-supply circuit board 35 is positively cooled by the cooling air received by the axial-flow fan 51, so that the cooling efficiency of the power-supply circuit board 35 can be further enhanced.

(6) The projector 1 is provided with the third sirocco fan 55 to exhaust cooling air toward the front face (light-emergence front side) of the light-source lamp 411, so that the first lens array 414, the unit including the polarization-converting elements 415 and the second lens array 416, and the optical elements, such as the UV filter 418, are arranged close to the front face of the light-source lamp 411, can be excellently cooled.

(7) The flow path between the first sirocco fan 52 and the axial-flow exhaust fan 54 is provided with the louver 215A as an opening for exhaust, so that the cooling air exhausted from the first sirocco fan 52 can be more efficiently exhausted through the axial-flow exhaust fan 54 and the louver 215A. Therefore, although the flow rate of the first sirocco fan 52 may be increased, the axial-flow fan 54 does not need to increase the flow rate thereof to enhance exhaust efficiency, so that by using the first sirocco fan 52 that has a large flow rate, the cooling efficiency of the light-source lamp 411 can be enhanced even more while maintaining a low noise level. In addition, the present invention is not limited to the embodiment described above, and other structures capable of achieving the object of the present invention are included therein, and the present invention can also be applied with the following modifications.

For example, in the third cooling system C according to the embodiment, the third sirocco fan 55 that receives the cooling air from the air-inlet 2C is used; however, part of the cooling air in the second cooling system B may be sent toward the front face of the light-source device 413 by allowing it to pass through between the lower case 22 and the inner case 47, for example. Thereby, the air-inlet 2C formed on the bottom face 221 can be omitted, so that the sucking of dust from the set-up place of the projector 1 can be reduced, thereby suppressing the effect of the dust on the optical elements.

In the embodiment, the power-supply circuit board 35 of the main power-supply 31 is arranged adjacent to the lamp-driving circuit board 36 of the ballast unit 32. However, any layout can be used. For example, the main power-supply 31 and the ballast unit 32 can be separately arranged so as to bilaterally sandwich the projection lens 46 therebetween, and accordingly, both the circuit boards 35 and 36 can be separated from each other.

The lamp-driving circuit board 36 of the ballast unit 32 is accommodated within the case member 37 serving also as a duct. Such a case member 37 may be arranged on demand. Thus, when it is not needed to satisfy safety standards, it may be omitted.

Still further, the case member may be of course arranged in order to form a duct, even when it is not needed according to the safety standard.

The first sirocco fan 52 is arranged so that the air-inlet 521 thereof faces the lamp-driving circuit board 36. The present invention can also be applied to the case wherein the air-inlet 521 faces the side face 222 of the outer case 2 on which an air-inlet is formed at the corresponding position so as to receive cooling air from the outside.

In the embodiment described above, the projector having three optical modulators is only described as an example; however, the present invention can be applied to a projector using only one optical modulator, a projector using two optical modulators, or a projector using four optical modulators or more. In the embodiment, the liquid crystal panel is used as an optical modulator; an optical modulator except the liquid crystal panel, such as a device using a micro-mirror, may be used. Also, in the embodiment, the transmission-type optical modulator having a plane of light-incidence and a plane of light-emergence both of which are different from each other is used; however, a reflection-type optical modulator having a plane of light-incidence and a plane of light-emergence both of which are identical to each other may be used. Furthermore, in the embodiment, the front-type projector in which projection is performed from the direction viewing a screen is only described as an example; the present invention can also be applied to a rear-type projector in which the projection is performed from the direction opposite to that viewing a screen.

As described above, according to the present invention, the base side of the light-source lamp is intensively cooled by the sirocco fan, while the exhaust fan is provided close to the light-source lamp so that the cooling air exhausted from the sirocco fan is allowed to quickly flow for cooling the light-source lamp. Therefore, even when a sirocco fan, in which the air pressure of cooling air is liable to be reduced, is used, the heat generated in the light-source lamp can be smoothly radiated into the cooling air, thereby efficiently cooling the light-source lamp. Since the sirocco fan is quiet as compared to a conventional axial-flow fan, there is an advantage that noises are suppressed to a low level.

What is claimed is:

1. A projector, comprising:
   a light-source lamp having a base side, luminous flux emitted from the light-source lamp being magnified and projected so as to form a projected image after being modulated;
   a sirocco fan that exhausts cooling air to the base side of the light-source lamp so as to intensively cool the base side of the light-source lamp; and
   an axial-flow fan disposed in a vicinity of the light-source lamp that exhausts the cooling air after completion of cooling.

2. The projector according to claim 1, further comprising a driving-circuit board that drives the light-source lamp, an air-inlet of the sirocco fan being arranged to face the driving-circuit board.

3. The projector according to claim 2, further comprising a case member having a hole bored therethrough in a direction parallel to a direction of cooling airflow, the driving-circuit board being accommodated in the case member.

4. The projector according to claim 2, further comprising a power-supply-circuit board arranged adjacent to the driving-circuit board.

5. The projector according to claim 4, further comprising another axial-flow fan that receives cooling air from an exterior of the projector, the power-supply-circuit board being arranged between the sirocco fan and the other axial-flow fan.

6. The projector according to claim 1, a flow path between the sirocco fan and the axial-flow fan being provided with an opening that outwardly exhausts part of the cooling air exhausted from the sirocco fan.

7. The projector according to claim 1, further comprising another sirocco fan that exhausts cooling air toward a front face of the light-source lamp.

8. A projector, comprising:
   a light-source lamp, luminous flux emitted from the light-source lamp being magnified and projected so as to form a projected image after being modulated;
   a first sirocco fan for use in internal cooling of the projector, the first sirocco fan including an air-inlet;
   a second sirocco fan that exhausts cooling air toward a front face of the light-source lamp; and
   a driving-circuit board that drives the light-source lamp, the air-inlet of the first sirocco fan being arranged to face the driving-circuit board.

* * * * *